United States Patent [19]
Yamashita et al.

[11] Patent Number: 5,652,760
[45] Date of Patent: Jul. 29, 1997

[54] ERROR RATE MEASURING APPARATUS

[75] Inventors: Syugo Yamashita; Yoshikazu Tomida, both of Osaka; Terumasa Tokumoto, Tokyo; Minoru Honda, Tokyo; Toshihiro Kubo, Tokyo, all of Japan

[73] Assignees: Sanyo Electric Co. Ltd., Osaka; Nippon Hoso Kyokai, Tokyo, both of Japan

[21] Appl. No.: 554,790

[22] Filed: Nov. 7, 1995

[30] Foreign Application Priority Data

Nov. 8, 1994 [JP] Japan .................................. 6-273331

[51] Int. Cl.⁶ ............................................ G06F 11/00
[52] U.S. Cl. ........................... 371/5.1; 371/5.4; 371/67.1
[58] Field of Search .......................... 371/5.1, 5.4, 57.2, 371/67.1, 71

[56] References Cited

U.S. PATENT DOCUMENTS

| | | | |
|---|---|---|---|
| 5,148,431 | 9/1992 | Hayashi | 371/5.1 |
| 5,455,536 | 10/1995 | Kono et al. | 371/5.1 |
| 5,473,615 | 12/1995 | Boyer et al. | 371/5.1 |

*Primary Examiner*—Robert W. Beausoliel, Jr.
*Assistant Examiner*—T. Tu
*Attorney, Agent, or Firm*—Nikaido Marmelstein Murray & Oram LLP

[57] ABSTRACT

An error rate measuring apparatus includes a demodulator, and data from the demodulator is applied to a decoding circuit in which an error bit number is evaluated for each of a BIC portion and a packet portion. In the BIC portion, if a synchronization is settled, the error bit number is evaluated by comparing received BICs and a predetermined BIC pattern, and if the synchronization is not settled, the error bit number is determined as eight (8) bits. In the packet portion, if a frame synchronization is settled and decoding is successful, the error bit number is calculated by comparing data before decoding and data after decoding with each other. If the frame synchronization is settled but the decoding is unsuccessful, a presumed error bit number is set according to the number of packets being decoded successfully in a first time horizontal direction, and if the frame synchronization is not settled, a predetermined error bit number is set. In each of the BIC portion and the packet portion, a bit error rate is calculated on the basis of the error bit number for each measurement range, and displayed on a monitor.

16 Claims, 18 Drawing Sheets

FIG. 8(A)

BIC PORTION

| | FRAME SYNCHRONIZATION | |
|---|---|---|
| | SETTLED | UNSETTLED |
| BLOCK SYNCHRONIZATION — UNSETTLED | COMPARING WITH BIC PATTERN CORRESPONDING TO BLOCK POSITION | 8 BITS IN ERROR OUT OF 16 BITS OF BIC |
| BLOCK SYNCHRONIZATION — SETTLED | | |

FIG. 8(B)

(272, 190) CODE PORTION

| | FRAME SYNCHRONIZATION | |
|---|---|---|
| | SETTLED | UNSETTLED |
| BLOCK SYNCHRONIZATION — UNSETTLED | CALCULATING ERROR BIT NUMBER | ERROR BIT NUMBER THAT DECODING IN HORIZONTAL DIRECTION IS SURELY UNSUCCESSFUL |
| BLOCK SYNCHRONIZATION — SETTLED | | |

ERROR RATE MEASURING APPARATUS

BACKGROUND OF THE INVENTION

1. Field of the Invention

The present invention relates to an error rate measuring apparatus. More specifically, the present invention relates to an error rate measuring apparatus by which a bit error rate at an arbitrary place can be detected in an FM multiplex broadcasting receiver or FM subcarrier data receiver, whereby it is possible to presume a difficulty of reception at that place.

2. Description of the Prior Art

A prior art error rate measuring apparatus is disclosed in, for example, Japanese Patent Application Laying-open No. 63-302637 (H04L 1/00).

In this prior art, the error rate of digital data is evaluated with utilizing an added error correction code; however, the number of error bits (hereinafter, called as "error bit number") is counted by only a syndrome calculation, and therefore, a counting accuracy is not good, and accordingly, an accuracy of the error rate also becomes bad.

SUMMARY OF THE INVENTION

Therefore, a principal object of the present invention is to provide an error rate measuring apparatus capable of measuring an error rate with higher accuracy.

An error rate measuring apparatus according to a first invention is an apparatus for detecting a reception situation of digital data including a synchronization signal, and comprises: a decoding means for decoding the digital data and outputting digital data before decoding and digital data after decoding; and an error rate measurement means for measuring an error rate on the basis of the digital data before decoding and the digital data after decoding both outputted from the decoding means.

An error rate measuring apparatus according to a second invention comprises: a first decoding means for outputting digital data before decoding; a second decoding means for outputting digital data after decoding; and an error rate measurement means for measuring an error rate on the basis of the digital data before decoding from the first decoding means and the digital data after decoding from the second decoding means.

FM subcarrier data is decoded by the decoding means with utilizing a majority logic decoding method, for example. The decoding means applies the FM subcarrier data before decoding and the FM subcarrier data after decoding to the error rate measurement means. At this time, the first decoding means which outputs the FM subcarrier data without being decoded and the second decoding means which outputs the FM subcarrier data with being decoded.

As to a packet being decoded successfully, the error bit number is calculated by an error bit number calculation means included in the error rate measurement means by comparing the data before decoding and the data after decoding. As to a packet which is not decoded successfully, a predetermined presumed error bit number is set by a presumed error bit number setting means. At this time, as the presumed error bit number, it is possible to set an arbitrary value below 50 percents of a decoding success rate, and the presumed error bit number is set by taking the number of success packets in a first time horizontal direction decoding into consideration. The number of the success packets is calculated by a success packet number calculation means. Furthermore, as to a block in which no synchronization is settled, a predetermined error bit number is set as an error bit number of the packet. Then, the error bit number and the presumed error bit number are accumulated for each of measurement ranges, and the bit error rate in the packet portion is calculated by a first bit error rate measurement means on the basis of accumulated values.

Furthermore, a bit error rate in a synchronization signal portion is measured by a second bit error rate measurement means on the basis of the synchronization signal. As to a block in which no synchronization is settled, a predetermined error bit number is set as an error bit number of the synchronization signal portion. Furthermore, a packet error rate is measured by a packet error rate measurement means, and a rate of blocks in each of which the frame synchronization is settled and a rate of blocks in each of which the block synchronization is settled are respectively measured by a synchronized block measurement means. These measurement data are also calculated for each of the measurement ranges. One of the measurement ranges can be set so as to include few or several blocks.

The measurement data are simultaneously or individually displayed by a display means, or printed-out by an output means. Furthermore, the measurement data are stored in a storage means, and may be printed-out by the output means as necessary.

In accordance with the present invention, the error bit number is calculated or set in accordance with whether or not the decoding is successful or unsuccessful and whether or not the synchronization is settled or unsettled, and therefore, it is possible to count the error bit number with higher accuracy. Accordingly, it is possible to measure the error rate with higher accuracy.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 8(A) is an illustrative view showing a calculation method of an error rate in a BIC portion, and FIG. 8(B) is an illustrative view showing a calculation method of an error rate in a (272, 190) code portion;

DETAILED DESCRIPTION OF THE PREFERRED EMBODIMENTS

Figure 1:
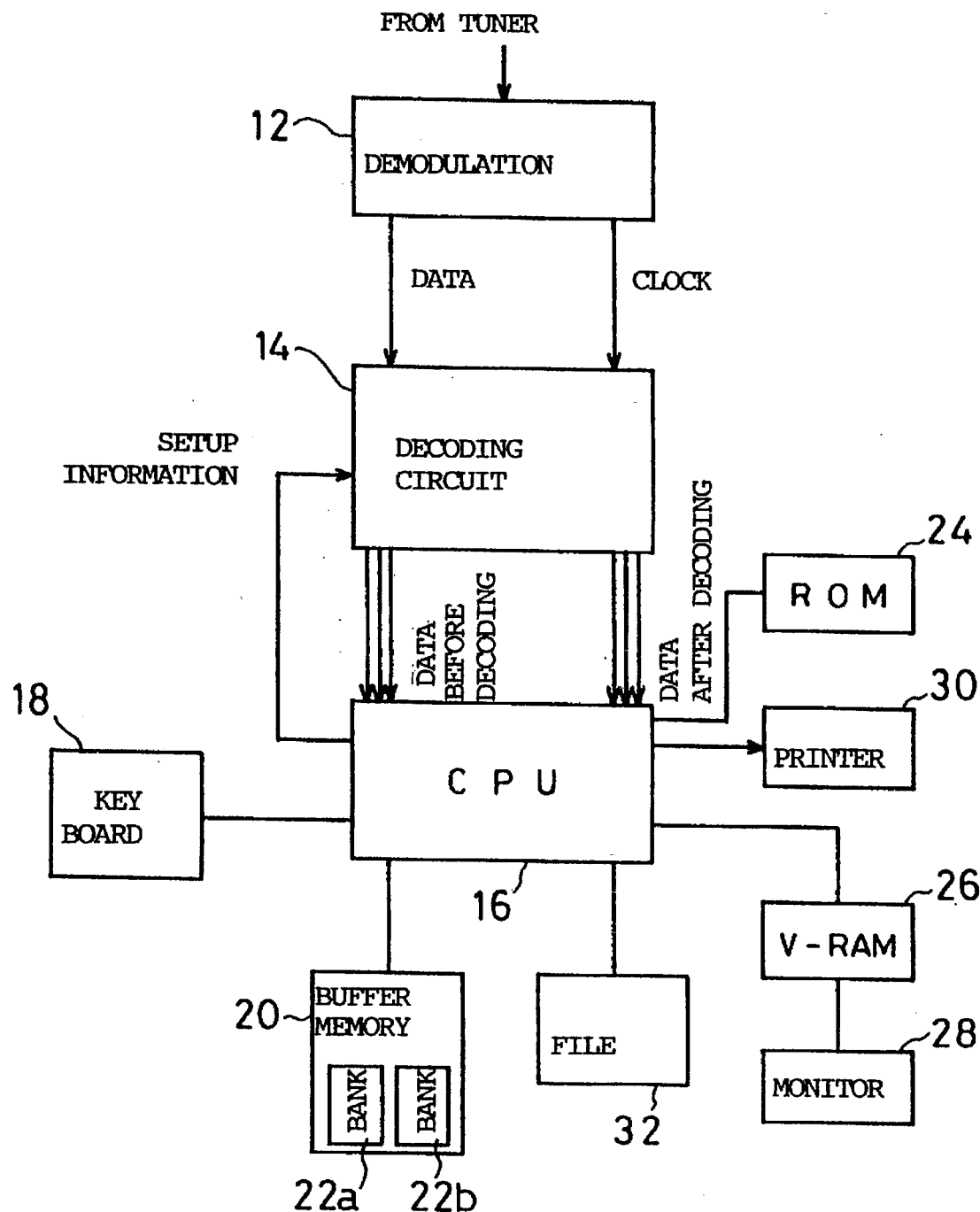
FIG. 1 is a block diagram showing one embodiment according to the present invention.

With referring to FIG. 1, an error rate measuring apparatus 10 of this embodiment shown includes a demodulator 12. As the demodulator 12, an LMSK demodulation IC of "LV3400M" manufactured by the assignee of the present invention may be utilized, for example. Digital data such as a (272, 190) shortened difference cyclic code capable of being decoded by a majority logic decoding method is applied to the demodulator 12 via a tuner (not shown). In this embodiment shown, as the digital data, data of a mobile FM multiplex broadcasting is utilized.

Figure 2:
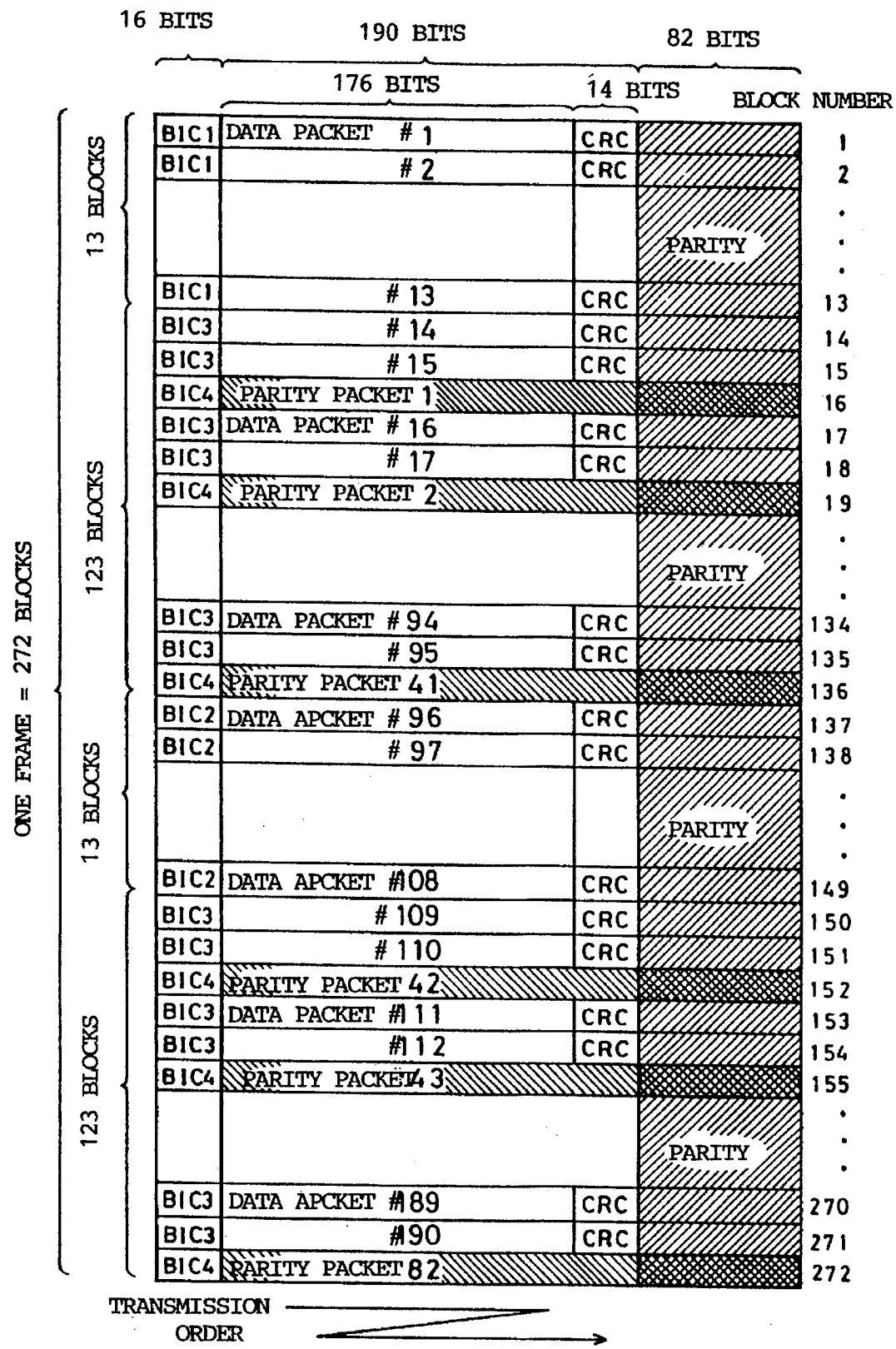
FIG. 2 is an illustrative view showing one example of frame structure in a mobile FM multiplex broadcasting.

Frame structure of such data is shown in FIG. 2. The FM subcarrier data is a product code encoded by the (272, 190) shortened difference cyclic code. The data shown in FIG. 2 includes 272 blocks in a single frame, and each block includes a BIC being a synchronization signal portion of 16 bits and a packet portion of 272 bits. The data is demodulated by the demodulator 12, and a clock and data are applied to a decoding circuit 14. Setup information for the decoding circuit 14 such as the numbers of times for forward protection and backward protection in the block synchronization and the frame synchronization, a BIC error-allowable bit number, and etc. are applied from a CPU 16 to the decoding circuit 14. The setup information is entered by a key board 18.

Figure 3:
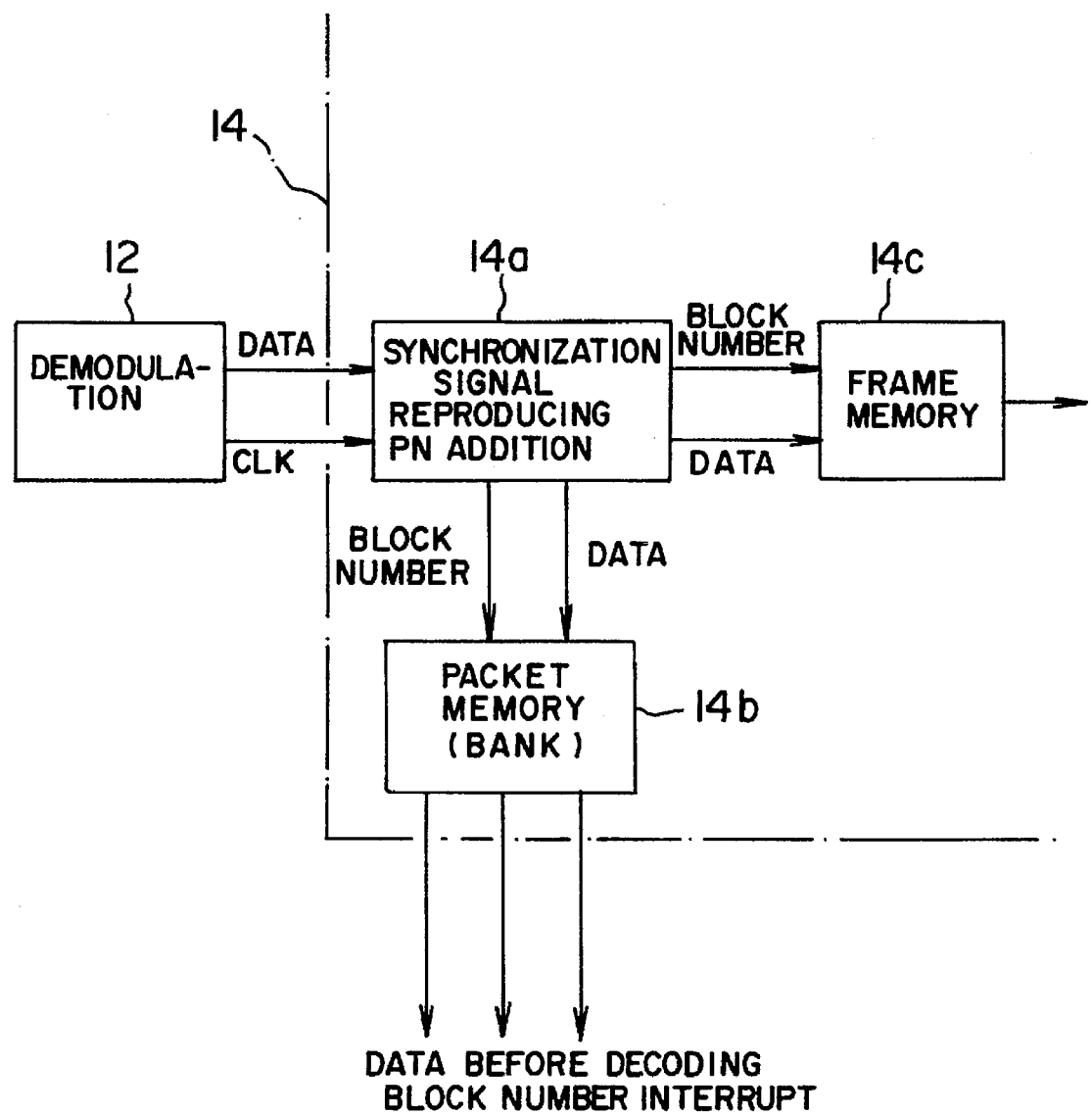
FIG. 3 is a block diagram showing a major portion of a decoding circuit.

The decoding circuit 14 as shown in FIG. 3 includes a synchronization signal reproduction/PN addition circuit 14a to which the clock and the data from the demodulator 12 are applied, and after a predetermined processing in the synchronization signal reproduction/PN addition circuit 14a, a block number of the data and the data are stored in a packet memory (bank memory) 14b and a frame memory 14c, respectively.

Then, the data before decoding, the block number of the data, interrupts and synchronization information and etc. are outputted from the packet memory 14b to a bank memory 22a in a buffer memory 20 via the CPU 16, and the same are stored in the bank memory 22a. On the other hand, the data stored in the frame memory 14c is decoded in a normal way by the decoding circuit 14 on the basis of the setup information, and data after decoding, the block number of the data, decoding success/unsuccess information, the interrupts and etc. are stored in a bank memory 22b of the buffer memory 20 through the CPU 16. The buffer memory 20 functions as a working memory for the CPU 16, and includes the two bank memories 22a and 22b each having a saving area of two frames. In addition, as the decoding circuit 14, a synchronization signal reproduction/error correction IC such as "LC72700E" manufactured by the assignee of the present invention may be included.

Figure 4:
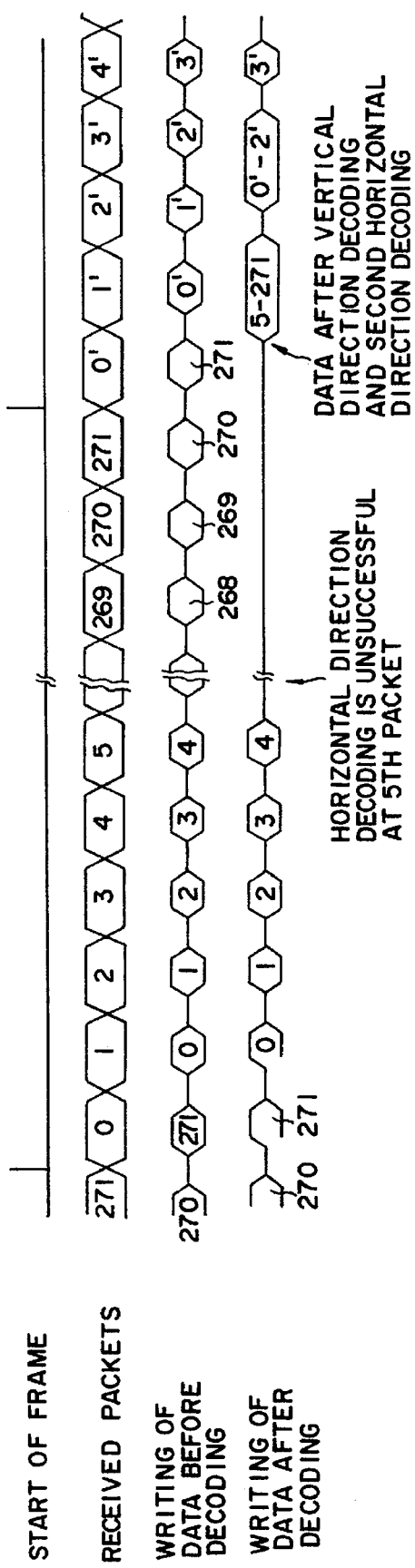
FIG. 4 is a timing chart showing a timing for writing data.

Writing timings of the data before decoding and the data after decoding into the bank memories 22a and 22b are shown in FIG. 4 wherein a case where the decoding of 5th block in the horizontal direction is failure is shown.

Figure 5A:
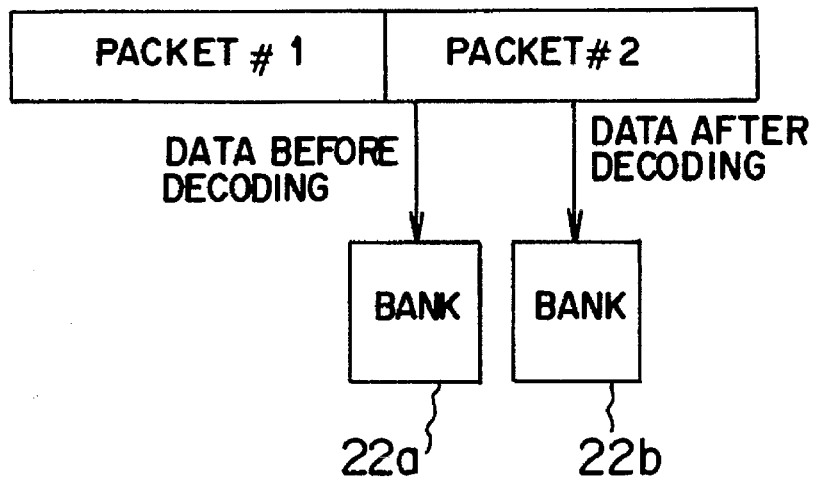
FIGS. 5(A) and (B) are illustrative views showing the timing for writing the data.
Figure 5B:
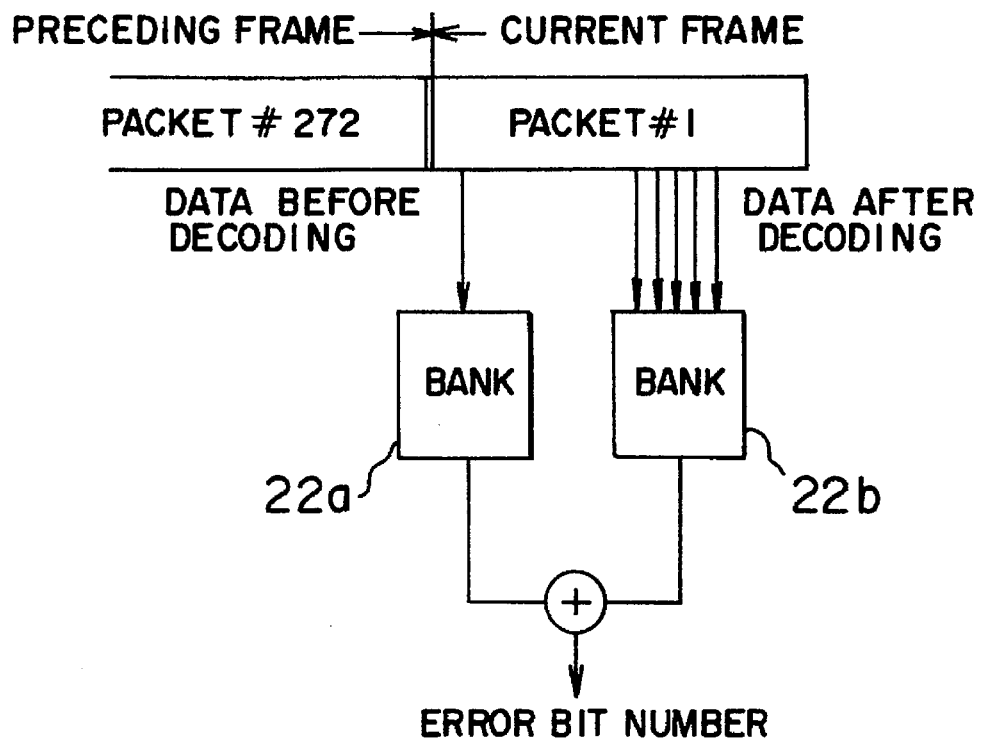

As shown in FIG. 5(A) wherein the data writing timings is shown with being further modified, the data before decoding of the packet #1 is stored in the bank memory 22a during the reception of the packet #2, and thereafter, the data after decoding of the packet #1 is stored in the bank memory 22b. Then, as shown in FIG. 5(B), the data before decoding of a last packet in the frame is stored in the bank memory 22a at a timing of the reception of a start packet of a next frame, and thereafter, the data after decoding that the decoding in the first time horizontal direction at is unsuccessful and the decoding in the vertical direction or the decoding in a second time horizontal direction is successful are sequentially stored in the bank memory 22b.

Figure 6:
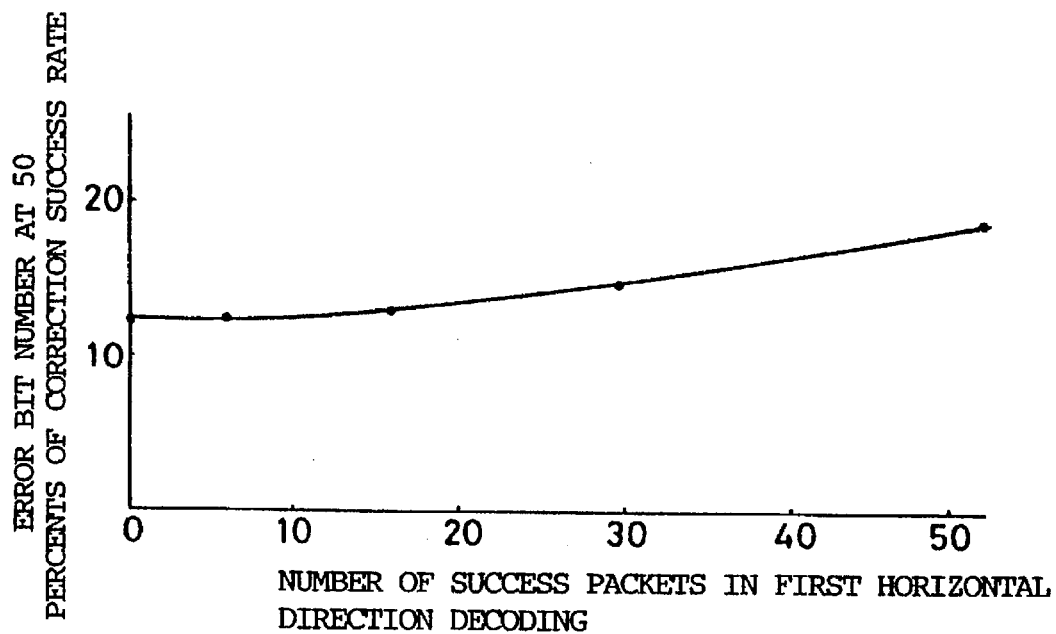
FIG. 6 is a graph showing a relationship between the number of the success packets in a first time horizontal direction decoding and the error bit number at a correction success rate of 50 percents.

Returning back to FIG. 1, a ROM 24 is connected to the CPU 16. In the ROM 24, other than an operation program, a table showing a relationship between the number of packets that the decoding in the first time horizontal direction is successful (success packets) and the error bit number at 50 percents of the correction success rate is stored in advance. Such a table is shown in FIG. 6. FIG. 6 shows a tendency that if the number of success packets in the first time horizontal direction is increased, the error bit number at the 50 percents of correction success rate is also increased.

Figure 7:
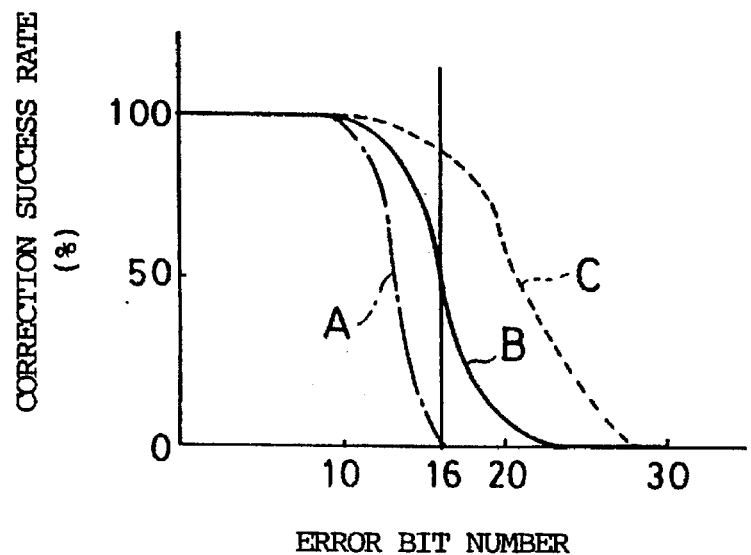
FIG. 7 is a graph showing a relationship between the error bit number and the correction success rate.

Now, a relationship between the error bit number and the correction success rate in the product data encoded by the (272, 190) shortened difference cyclic code is shown in FIG. 7. A characteristic curve shown in FIG. 7 is changed according to the number of the success packets in the first time horizontal direction. That is, the characteristic curve becomes a one-dotted line A at a time that the number of the success packets in the first time horizontal direction is small, and then, shifted to a solid line B and a dotted line C according to increased of the number of the success packets.

Next, a calculation method of the bit error rate performed by the CPU 16 will be described. The measurement range for the bit error rate is divided into the BIC (Block Identification Code) portion and the (272, 190) shortened difference cyclic code portion (packet portion).

First, as to the BIC portion, as shown in FIG. 8(A), when the block synchronization and the frame synchronization are settled, the bit error rate of the BIC portion is calculated by comparing the BIC pattern according to the block position and the BICs of the reception data. Furthermore, if at least one of the block synchronization and the frame synchronization is unsettled, it is regarded as that bits equal to a half of all bits of a single BIC portion, i.e. 8 bits are in error.

Furthermore, as to the packet portion, i.e. the (272, 190) code portion, as shown in FIG. 8(B), for only a packet in which the frame synchronization is settled and the decoding is successful, the error bit number is calculated by comparing the packet and the packet which is stored in the bank memory 22a and corresponds to the packet, i.e. the data before decoding.

On the other hand, as to the packet in which the decoding is unsuccessful, the presumed error bit number in a single packet (272 bits) is set by taking FIG. 6 into consideration. More specifically, the error bit number at below 50 percents of the correction success rate is set as the presumed error bit number; however, the error bit number at 50 percents of the correction successful rate is changed according to the number of packets being decoded successfully in the first time horizontal direction. Therefore, the presumed error bit number is set according to the number of the success packets in the first time horizontal direction decoding.

As one example, if the number of the success packets in the first time horizontal direction decoding is at a degree of thirty (30), approximately, the error bit number at 50 percents of the correction success rate becomes at a degree of fifteen (15), approximately, and therefore, the presumed error bit number more than "15" is set. If the error bit number at 50 percents of the correction success rate is set as the presumed error bit number, the bit error rate in a delicate area wherein the decoding may be successful or unsuccessful, i.e. in an area wherein the bit error is small can be measured correctly. When the correction success rate is less than 50 percents, a possible value that the decoding is unsuccessful becomes more than 50 percents, and therefore, the error bit number at 50 percents of the correction success rate can be regarded as a bit number with high reliability that the decoding almost becomes unsuccessful.

In addition, at a time that the frame synchronization is unsettled, the error bit number that the decoding in the horizontal direction becomes surely unsuccessful is fixedly set as the error bit number of the packet. The bit error rate is calculated on the basis of the error bit number and the presumed error bit number.

By the CPU 16, other than the bit error rate, measurement items such as the packet error rate, ratios of the blocks in which the frame synchronization and the block synchronization are settled, and etc. are measured.

Furthermore, a monitor 28 is also connected to the CPU 16 via a VRAM 26, and a printer 30 is further connected to the CPU 16.

At a time of the measurement in a real time fashion, the CPU 16 plots "1" on coordinates of the VRAM 26 being indicated by the measurement data to be displayed, and therefore, the measurement data can be displayed on the monitor 30 in a real time fashion. Furthermore, if it is required to print-out the measurement data, the CPU 16 reads the measurement data existing in the VRAM 26, and outputs the measurement data with printer control commands to the printer 30, thereby to print-out the measurement data. Accordingly, the measurement data displayed on the monitor 30 may be printed-out by the printer 30.

Figure 9:
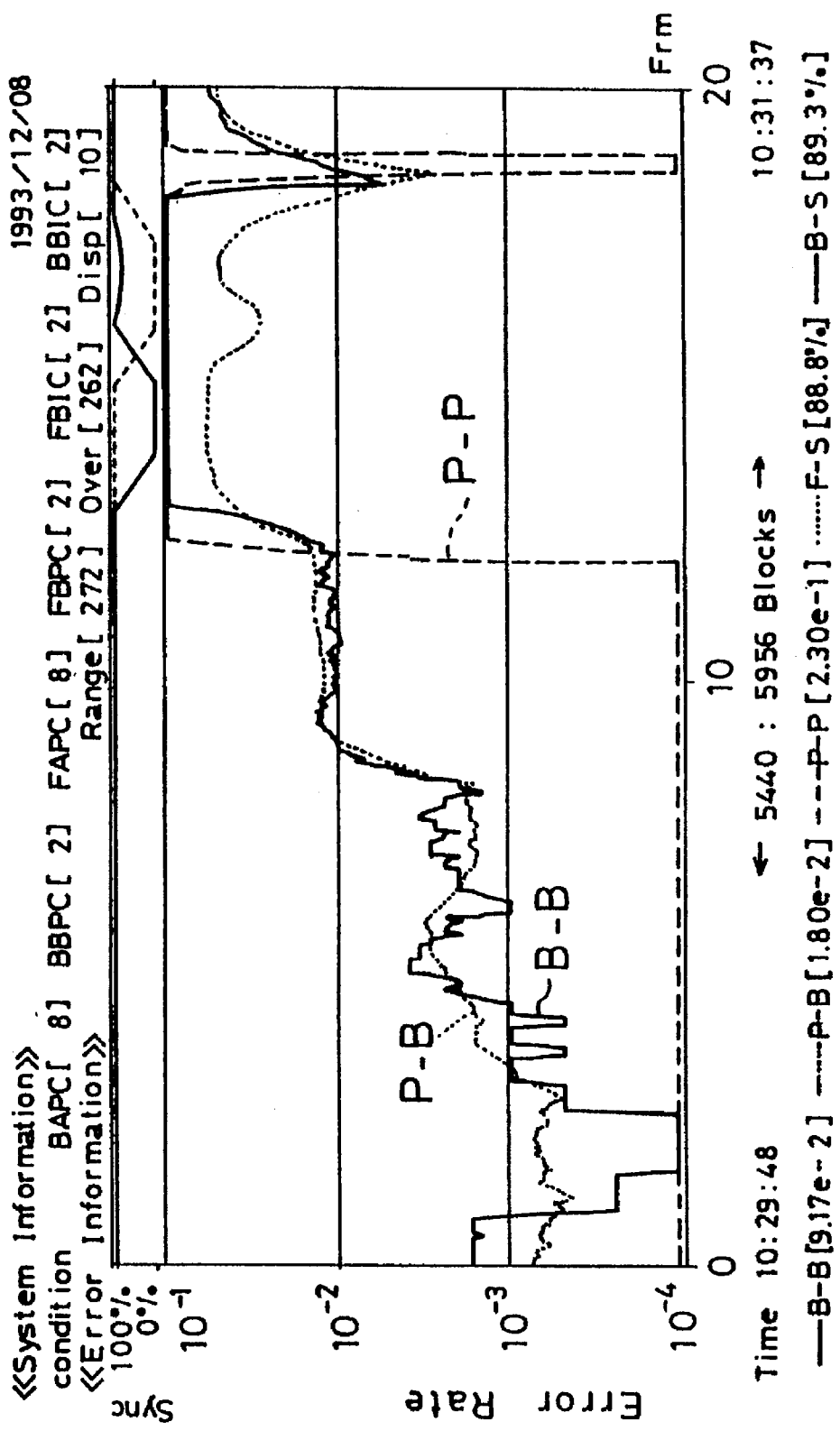
FIG. 9 is an illustrative view showing one example of measurement data displayed on a monitor.

Furthermore, a file 32 is connected to the CPU 16, in which the measurement data is stored. When the measurement data within the file 32 is to be printed-out, the measurement data is read-out and stored in the VRAM 26, and thereafter, the measurement data is printed-out by the printer In addition, on the monitor 30, the measurement result is displayed in a real time fashion as shown in FIG. 9, for example.

With referring to FIG. 9, variables displayed on the monitor 30 will be described. The data existing at right end in a portion indicated by [System Information] is a date.

In a portion indicated by [Condition], there are values of the following parameters.

BAPC: the number of the times for block forward protection

BBPC: the number of the times for block backward protection

FAPC: the number of the times for frame forward protection

FBPC: the number of the times for frame backward protection

FBIC: the number of the BIC error-allowable bits (forward protection)

BBIC: the number of the BIC error-allowable bits (backward protection)

In addition, these parameter values are inputted in advance by the key board 18 prior to the measurement.

"Range", "Over" and "Disp" indicated in a portion of [Error Information] are displayed by the following reasons.

Figure 10:
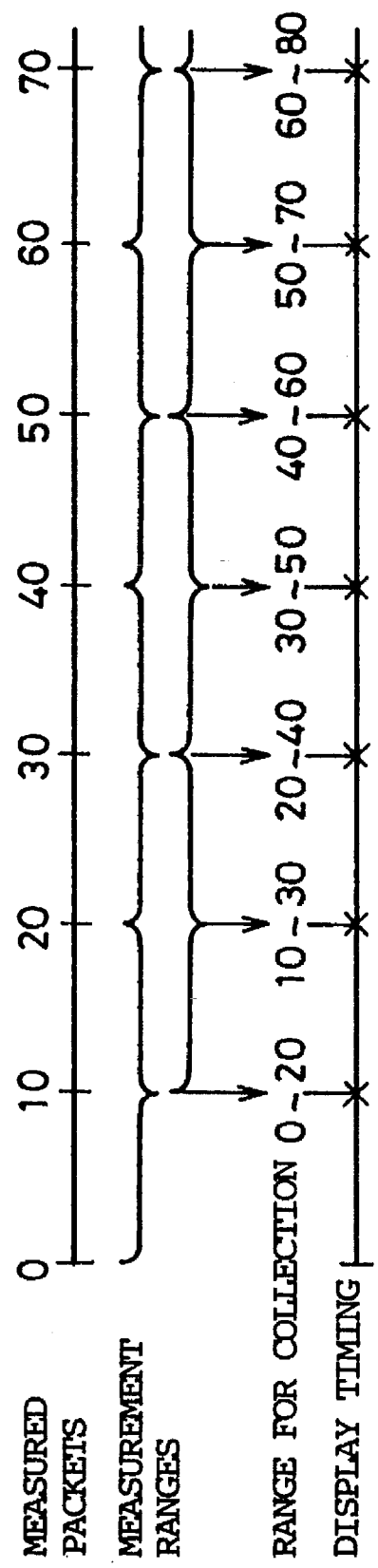
FIG. 10 is an illustrative view showing a measured packet number, measurement ranges, a display timing and etc.

If the error rates of the BIC portion and the packet portion are measured with utilizing the bits included in a single block (16 bits in the BIC portion, and 272 bits in the packet portion), sufficient accuracy may not be obtained, and therefore, the error rates are calculated by handling a few or several blocks in the BIC portion or the packet portion in a lump. "Range" indicates the number of the blocks handled in a lump. "Over" indicates the number of the blocks shared by two adjacent ranges. In addition, a reason why a plurality of blocks are shared by the adjacent two ranges is to suppress fluctuations of the error rates obtainable by respective ranges. When, the "Range" and "Over" are decided, "DISP" which indicates a display interval between the adjacent ranges with utilizing the number of the blocks is obtainable. FIG. 10 shows a case where "Range" is "20", "Over" is "10" and "DISP" is "10".

By setting "Range" in a manner that a plurality blocks in the BIC portion or the packet portion can be handled in a lump, even if the error bit number at a given time becomes extremely large due to a noise, it is possible to round such a noise, and therefore, the measurement data with higher accuracy can be obtained. More specifically, in a field wherein the error bit numbers of the adjacent blocks are largely different from each other due to a noise, for example, if the error rate is measured for each block, the fluctuation of the error rates becomes large, and accordingly, it becomes difficult to correctly judge the reception characteristic at the field. Therefore, in this embodiment shown, by handling a plurality of blocks in a lump, it is possible to calculate the error rate while the stability and the measurement accuracy are increased.

Furthermore, in a portion of [Error Information], a graph showing the synchronization information and a graph showing the error rates are displayed.

The synchronization information include the following information.

F-S (dotted line): a ratio of the blocks in each of which the frame synchronization is settled with respect to all the blocks within the measurement range B-S (solid line): a ratio of the blocks in each of which the block synchronization is settled with respect to all the blocks within the measurement range.

Furthermore, the error rates include the following information.

B-B: the bit error rate calculated by the BIC within the measurement range (a ratio of the total number of the error bits of the BIC with respect to the total number of all the bits of the BIC within the measurement range).

P-B: the bit error rate calculated by the packet portion within the measurement range (a ratio of the total number of the error bits of the packet portion with respect to the total number of all the bits of the packet portion within the measurement range).

P-P: the packet error rate within the measurement rage (a ratio of the total number of the error packets being decoded unsuccessfully with respect to the total number of all the packets within the measurement rage).

In addition, the packet error rate means a value after the decoding in the horizontal direction and the decoding in the vertical direction.

Furthermore, below the graph indicative of the error rate, the following parameters are displayed. In a portion of [Time], a measurement start time and a measurement end time are indicated at left end and right end, respectively, and between the start time and the end time, "5440: 5956 blocks" are indicated. "5440" indicates the number of the measured blocks, and "5956" indicates the number of the blocks used in measuring.

It is possible to determine whether or not the measurement is performed correctly with referring to the measurement start time, the measurement end time and the number of the blocks used in measuring. In the measurement in a state where the reception situation is relatively good, difference between "measurement time=measurement end time−measurement start time" and "the number of the blocks used in measuring×0.018 seconds" becomes more than 4.896 seconds (one frame), there is a possibility that the processing ability of the CPU 16 is not sufficient, and therefore, it is necessary to change the CPU 16 by a CPU having a higher processing ability.

Below the portion of [Time], there is displayed a value with being bracketed after the end of the measurement, which indicates the error rates or ratios (percents) with respect to all the measurement data in the whole of the measurement.

Next, an operation of the error rate measurement apparatus 10 of this embodiment shown will be described in the following.

Figure 11:
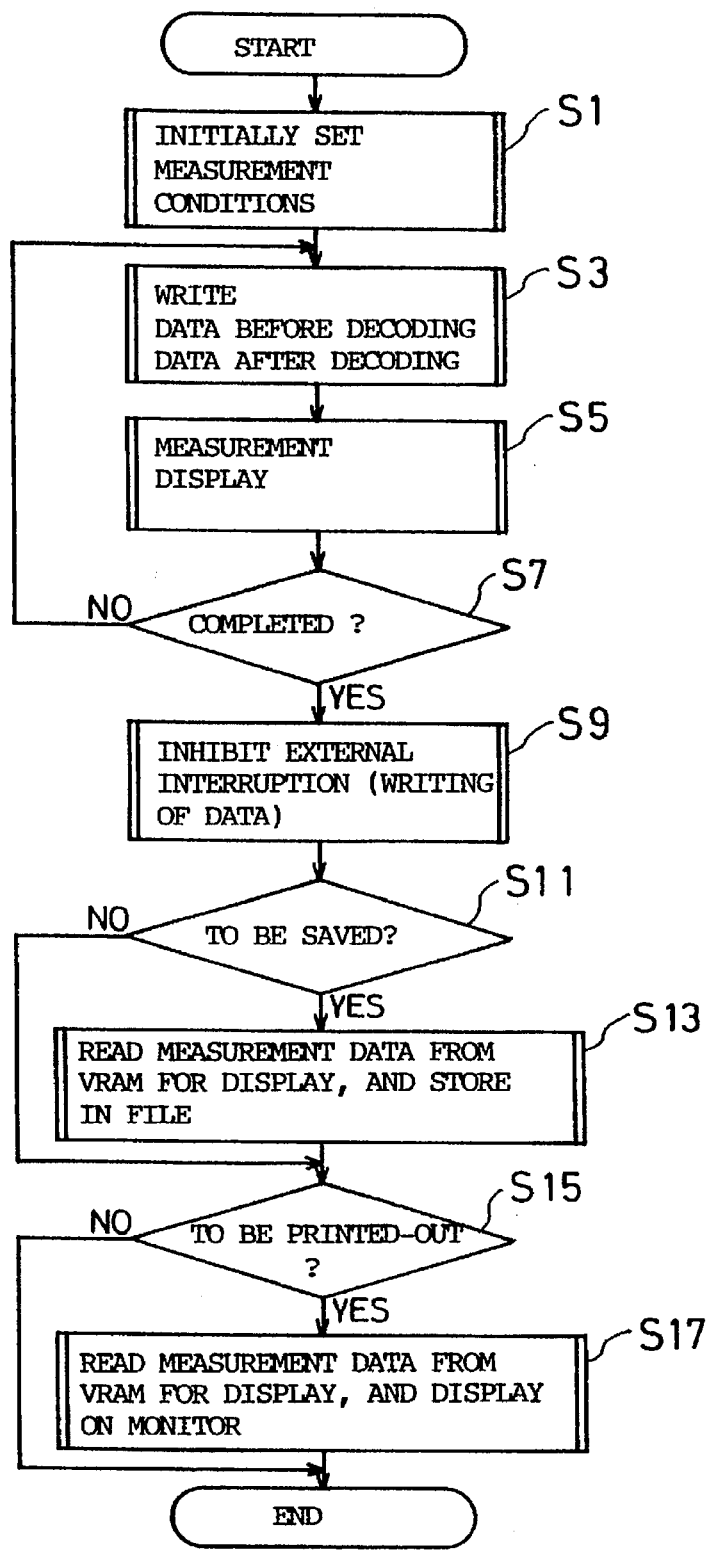
FIG. 11 is a flowchart showing an operation of the embodiment.

First, in a step S1 shown in FIG. 11, the measuring conditions are initially set. More specifically, the step S1 is performed according to a subroutine shown in FIG. 12.

Figure 12:
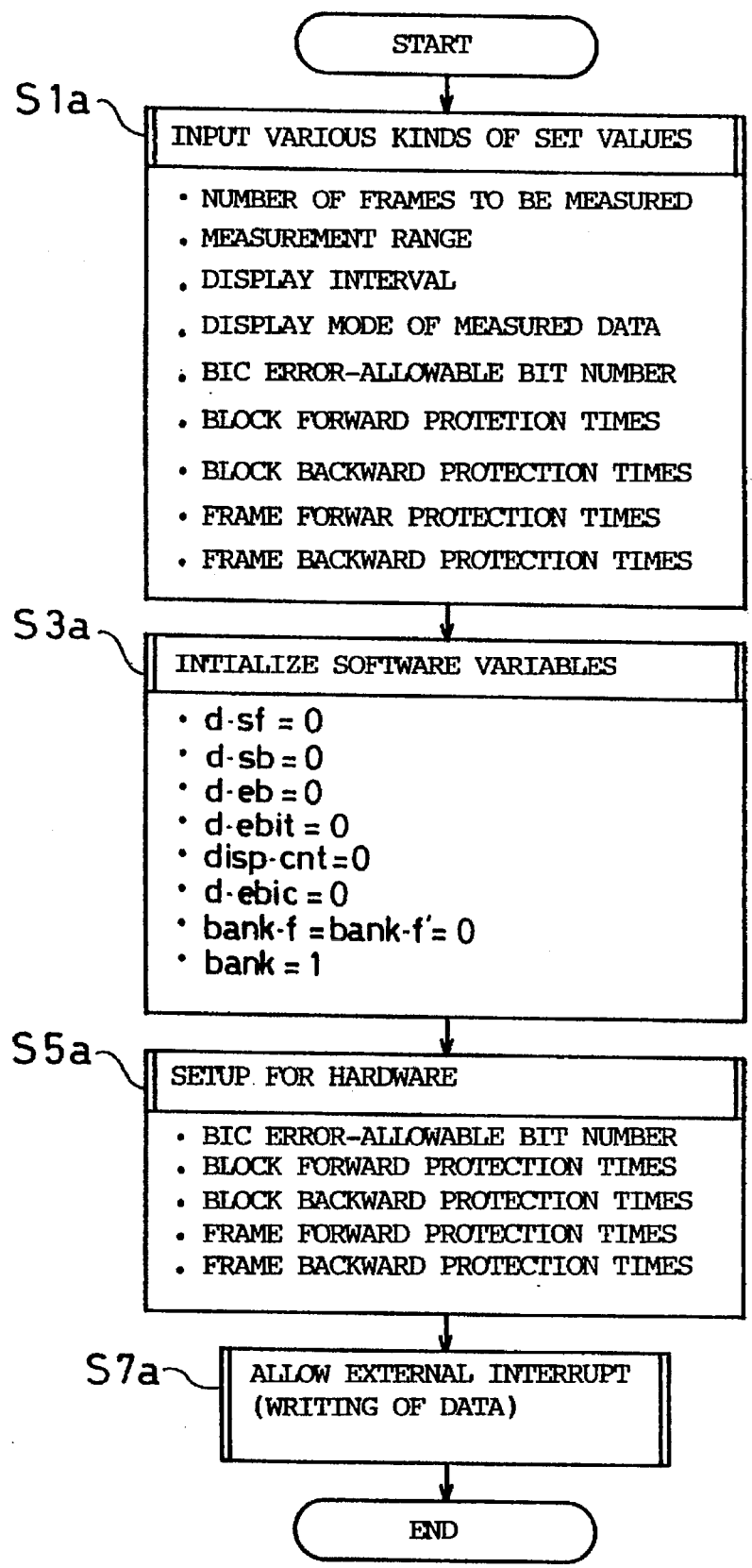
FIG. 12 is a flowchart showing a subroutine for initially setting measurement conditions.

In a step S1a shown in FIG. 12, various setting values such as the number of the measuring frames, the measurement range (the number of the blocks handled in a lump), the display interval (the number of the blocks) and a display mode of the measurement data are inputted. By setting the display mode of the measurement data, it is possible to simultaneous display respective measurement data or individually display the respective measurement data on the monitor 28. Furthermore, in the step S1a, the number of the BIC error-allowable bits, the number of the times for block forward protection, the number of the times for block backward protection, the number of the times for frame forward protection, and the number of the times for frame backward protection are also inputted, and these set values are applied to the CPU 16. In addition, the operation will be described on the assumption that the measurement range and the display interval are set to be equal to each other.

Next, in a step S3a, the software variables are initialized. That is, there are set as d-sf (the number of the packets in each of which the frame synchronization is unsettled)=0, d-sb (the number of the packets in each of which the block synchronization is unsettled)=0, d-eb (the number of the packets in each of which the decoding is unsuccessful)=0, d-ebit (the error bit number in the packet portion)=0, dispcnt (a display packet counter)=0, d-ebic (the error bit number in the BIC portion)=0, bank-f=bank-f'=0, bank=1. In addition, by setting band-f=bank-f'=0, and bank=1, one sides of the bank memories 22a and 22b are selected, respectively.

Then, in a step S5a, the hardware is set-up. That is, the number of the BIC error-allowable bits, the number of the times for block forward protection, the number of the times for block backward protection, the number of the times for frame forward protection and the number of the times for frame backward protection are set and applied to the decoding circuit 14. Next, in a step S7a, the external interrupt (writing of the data) is permitted.

Returning back to FIG. 11, in a step S3, the data before decoding and the data after decoding are written in the memories. The writing of the data before decoding is performed by executing an interrupt routine shown in FIG. 13, and the writing of the data after decoding is performed by executing an interrupt routine shown in FIG. 14.

Figure 13:
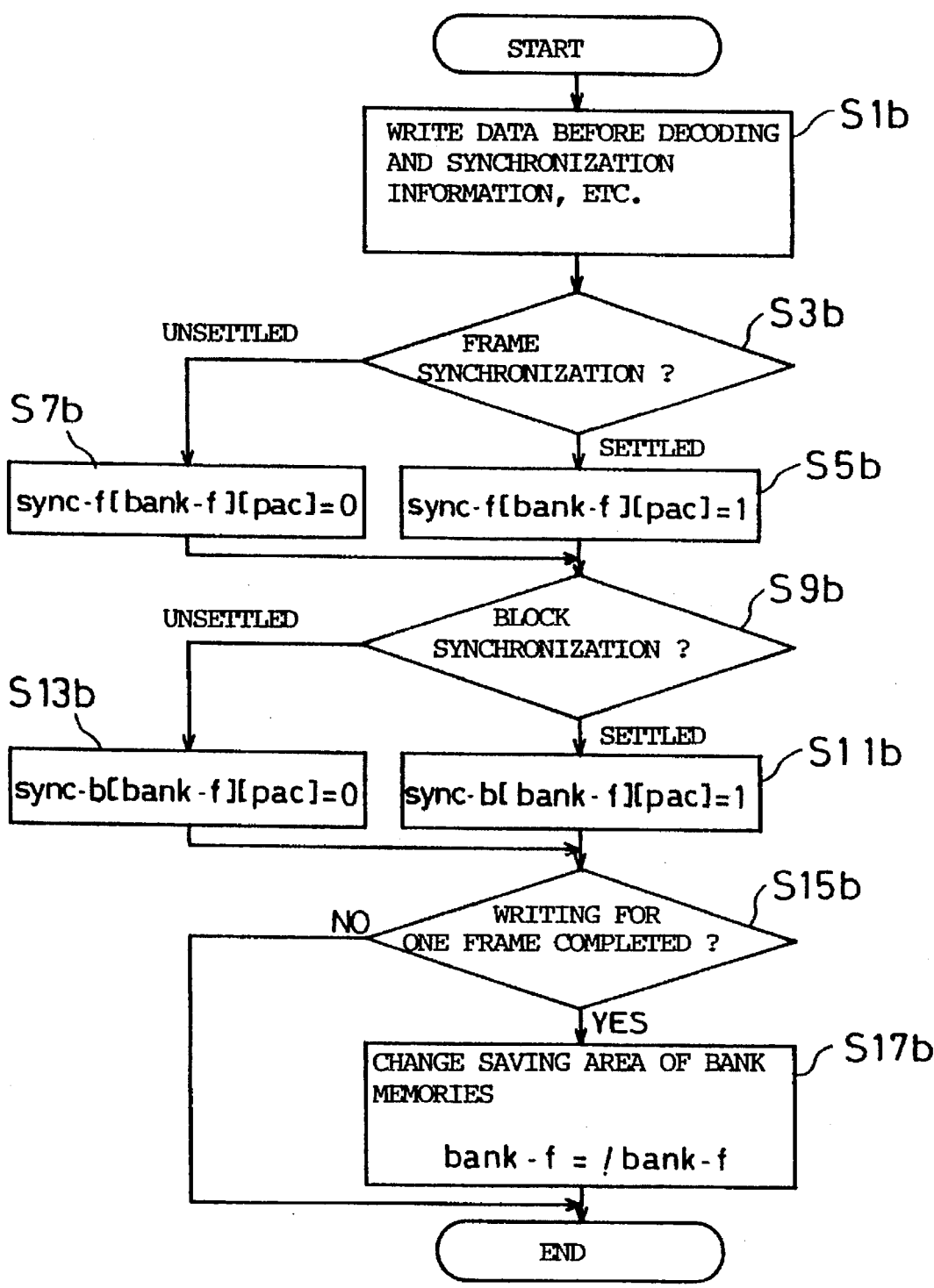
FIG. 13 is a flowchart showing a routine for writing data before decoding.

In the writing routine of the data before decoding, first, in a step S1b shown in FIG. 13, the data before decoding, the synchronization information and etc. are written in the bank memory 22a of the buffer memory 20. Next, in a step S3b, it is determined whether or not the frame synchronization is settled, and if the frame synchronization is settled, in a step S5b, sync-f[bank-f] [pac]=1 being indicative of the frame synchronization is set. In addition, [pac] indicates the block number within one frame. On the other hand, if the frame synchronization is unsettled in the step S3b, in a step S7b, sync-f[bank-f][pac]=0 representing that the frame synchronization is unsettled is set. After the step S5b or S7b, the process proceeds to a step S9b.

In the step S9b, it is determined whether or not the block synchronization is settled. If "YES" is determined, in a step S11b, sync-b[bank-f][pac]=1 representing that the block synchronization is settled is set. If "NO" is determined in the step S9b, in a step S13b sync-b[bank-f][pac]=0 representing that the block synchronization is unsettled is set. After the step S11b or S13b, the process proceeds to a step S15b.

In the step S15b, it is determined whether or not the writing of the data of one frame is completed. If "YES", in a step S17b, a saving area of the bank memory 22b to which the data is saved is changed (bank-f=!bank-f). In addition, "!" indicates the change of area.

Figure 14:
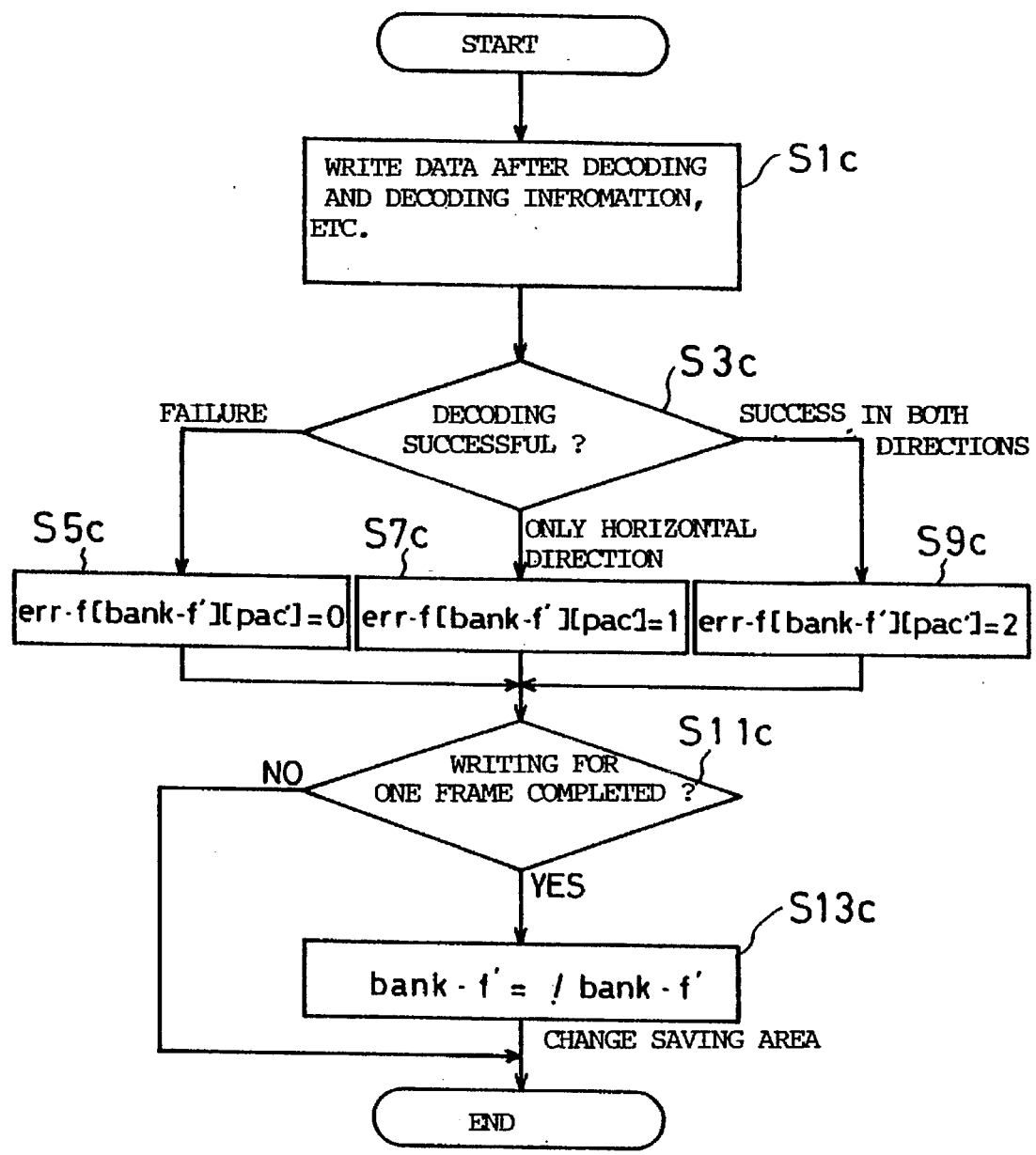
FIG. 14 is a flowchart showing a routine for writing data after decoding.

Next, with referring to FIG. 14, in a step S1c, the data after decoding, the decoding information and etc. are written in the bank memory 22b. Then, in a step S3c, it is determined whether or not the decoding is successful. If the decoding is unsuccessful, in a step S5c, err-f[bank-f'][pac'] =0 is set. If the decoding in the first time horizontal direction is successful, in a step S7c, err-f[bank-f'][pac']=1 is set. Furthermore, if the decoding in the vertical direction or the second horizontal direction is successful, in a step S9c, err-f[bank-f'][pac']=2 is set. Then, after the step S5c, S7c or S9c, the process proceeds to a step S11c in which it is determined whether not the writing of the data of one frame is completed. If "YES" is determined in the step S11c, in a step S13c, the saving area of the bank memory 22b is changed (bank-f'=!bank-f').

Returning back to FIG. 11, in a next step S5, the measurement of various kinds of measurement data and display of the same are performed. A subroutine for the step S5 is illustrated in FIG. 15 and FIG. 16.

Figure 15:
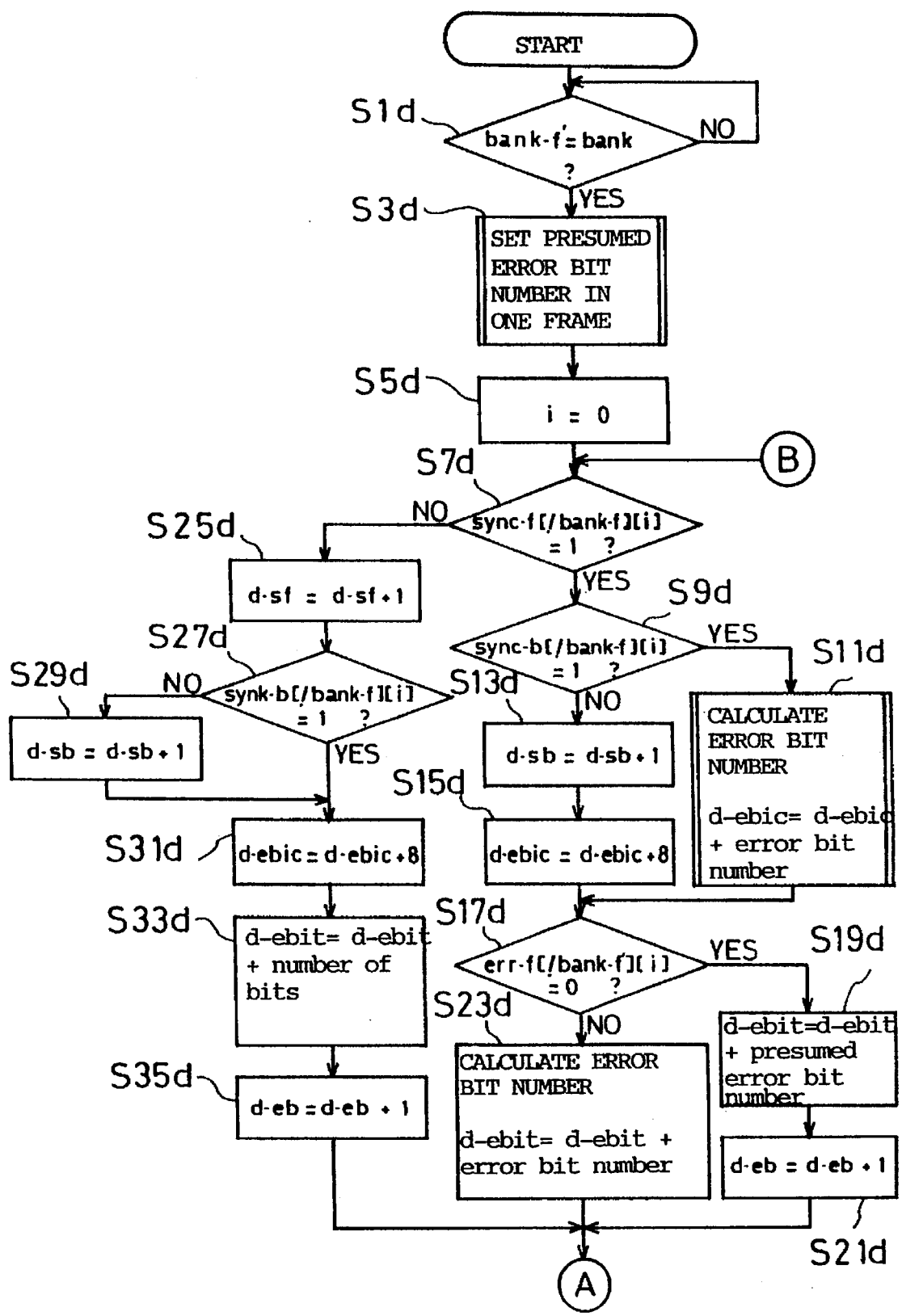
FIG. 15 is a flowchart showing a subroutine for measuring and displaying measured data.
Figure 16:
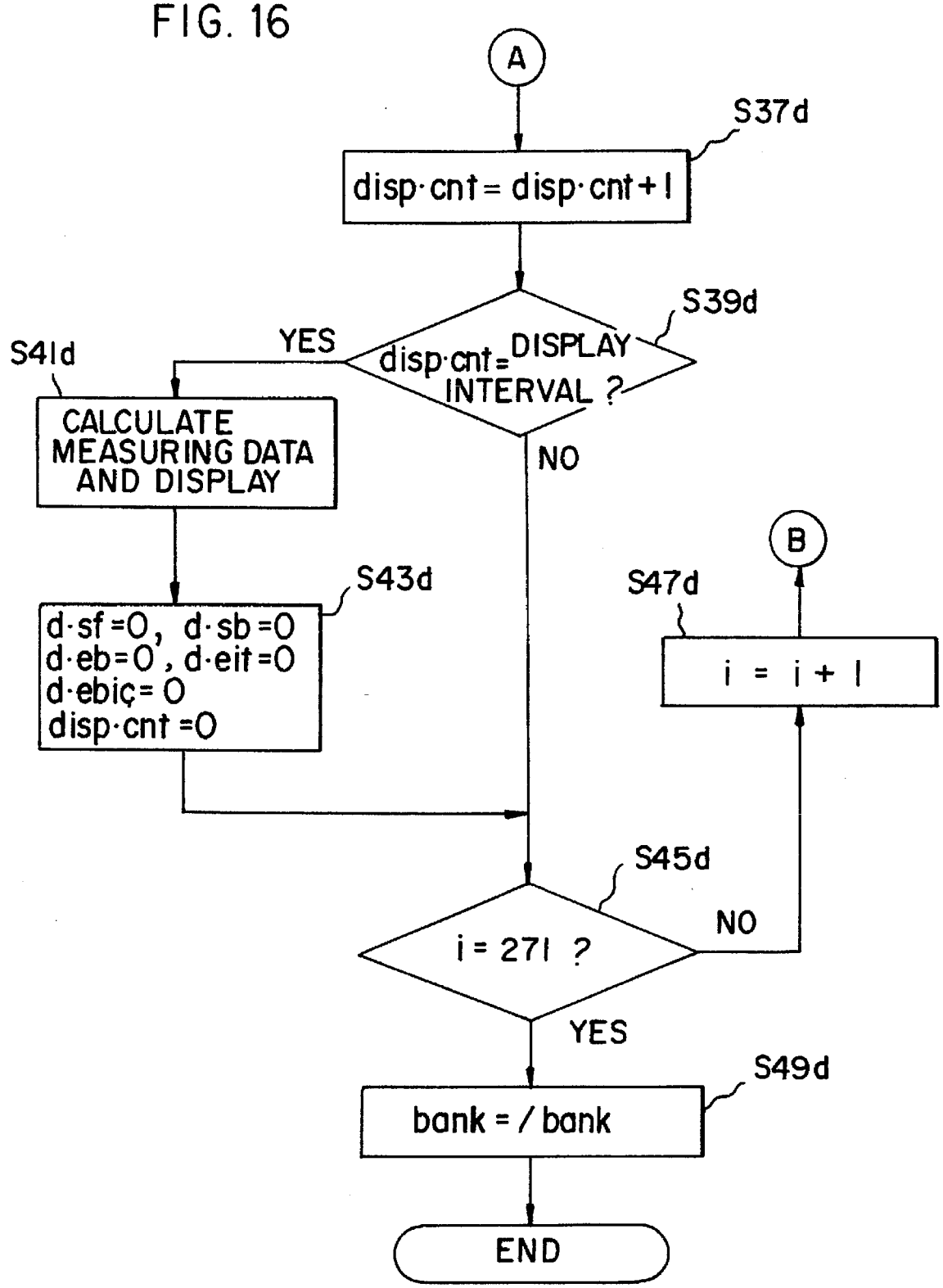
FIG. 16 is a flowchart showing an operation succeeding to FIG. 15.

In a step S1d shown in FIG. 15, it is determined whether or not bank-f'=bank. If "YES" is determined, the process proceeds to a step S3d. In addition, the step S1d is a process for determining whether or not the data of one frame is written in the bank memory 22b, and therefore, if the data of the one frame is written in the bank memory 22b, the process proceeds to the step S3d.

In the step S3d, the presumed error bit number within one packet is set. The presumed error bit number is calculated on the basis of the number of the packets in each of which the decoding in the first time horizontal direction is successful (err-f[bank-f'][pac']=1) by taking the relationship shown in FIG. 6 into consideration.

Next, in a step S5d, i=0 is set, and in a step S7d, it is determined whether or not the frame synchronization is settled, that is, sync-f[!bank-f][i] is "1". If "YES" is determined in the step S7d, in a step S9d, it is determined whether or not the block synchronization is settled, that is, sync-b [!bank-f][i] is "1". If "YES" is determined in the step S9d, in a step S11d, the error bit number is calculated by comparing the BIC pattern corresponding to the block position and the BICs in the reception data, and the error bit number is accumulated (d-ebic=d-ebic+error bit number).

If "NO" is determined in the step S9d, in a step S13d, the number of the packets in each of which the block synchronization is unsettled is incremented (d-ebic=d-sb+1). Next, in a step S15d, the error bit number of the BIC portion is accumulated by 8 bits (d-ebic+e-ebic+8).

After the step S11d or S15d, in a step S17d, it is determined whether or not the decoding is unsuccessful, that is, err-f[!bank-f'][i] is "0". If "YES", in a step S19d, the presumed error bit number is accumulated as the error bit number (d-ebit=d-ebit+presumed error bit number). In addition, the presumed error bit number is set according to the number of the packets in each of which the first time horizontal direction decoding is successful within one frame, that is, the total number of the packets indicated by err-f[bank-f'][pac']=1 in the step S7c shown in FIG. 13. Then, in a step S21d, the number of the packets in each of which the decoding is unsuccessful is incremented (d-eb=d-eb+1).

On the other hand, if "NO" is determined in the step S17d, in a step S23d, the error bit number is calculated by comparing the data before decoding and the data after decoding being respectively saved in the buffer memories 22a and 22b, and the error bit number is accumulated (d-ebit=d-ebit+error bit number).

If "NO" is determined in the previous step S7d, in a step S25d, the number of the packets in each of which the frame synchronization is unsettled is incremented (d-sf=d-sf+1). Next, in a step S27d, it is determined whether not the block synchronization is settled, that is, sync-b[!bank-f][i] is "1". If "NO" is determined in the step S27d, in a step S29d, the number of the packets in each of which the block synchronization is unsettled is incremented (d-sb=d-sb+1). If "YES" is determined in the step S27d, or after the step S29d, the process proceeds to a step S31d.

In the step S31d, the error bit number of the BIC portion is accumulated by "8" (d-ebic=d-ebic+8). Next, in a step S33d, the error bit number is accumulated. As the error bit number, the bit number that the decoding in the horizontal direction becomes to be surely unsuccessful, e.g. the bit number fixed at a degree of "16", for example, is set and accumulated (d-ebit=d-ebit+the fixed bit number). Next, in a step S35d, the number of the packets in each of which the decoding is unsuccessful is incremented (d-eb=d-eb+1).

After the step S21d, S23d or S35d, the process proceeds to a step S37d shown in FIG. 16, in which the display packet counter is incremented (disp-cnt=disp-cnt+1).

In a succeeding step S39d, it is determined whether or not a count value of the display packet counter is equal to the number of the packets for the display interval. If "YES" is determined in the step S39d, in a step S41d, the various kinds of measurement data such as the bit error rate, the rate of the blocks in each of which the block synchronization is settled, and the rate of the packets in each of which the packet synchronization is settled are calculated on the basis of the measurement values such as the error bit number within the measurement range, and the same are displayed on the monitor 28. Then, in a step S43d, the software variables are initialized. That is, d-sf=0, d-sb=0, d-eb=0, d-ebit=0, d-ebic=0 and disp-cnt=0 are set, and then, the process proceeds to a step S45d. If "NO" is determined in the step S39d, the process also proceeds to the step S45d.

In the step S45d, it is determined whether or not the processing for one frame is terminated, that is, "i" is "270". If "NO" is determined in the step S45d, that is, if the processing for one frame has not been terminated, in a step S47, "i" is incremented (i=i+1), and then, the process returns to the step S7d. If "YES" becomes to be determined in the step S45d, that is, if the processing for one frame has been terminated, in a step S49d, other sides of the bank memories 22a and 22b are set to be used (bank=!bank).

Returning back to FIG. 11, in a step S7, it is determined whether or not the measurement of various kinds of data for the number of the frame to be measured are completed. If "NO", the process returns to the step S3, and if "YES" is determined, in a step S9, the external interruption (data writing) is inhibited, and in a step S11, it is determined whether or not the measurement data is to be saved. If "YES" is determined in the step S11, in a step S13, the measurement data being stored in the VRAM 26 is read, and saved in the file 32. Thereafter, the process proceeds to a step S15. If "NO" is determined in the step S11, the process also proceeds to the step S15.

In the step S15, it is determined whether or not the measurement data is to be printed-out. If "YES", the process proceeds to a step S17. When the measurement data is not saved in the file 32, in the step S17, the measurement data is read from the VRAM 26 and displayed on the monitor 28. If the measurement data is saved in the file 32, in a step S17, the measurement data is read from the file 32, and written in the VRAM 26, and then, the measurement data being stored in the VRAM 26 is read and displayed on the monitor 28.

According to the embodiment, the bit error rates can be simultaneously displayed on the monitor 28. Furthermore, in view of a fact that settlement situations of the block synchronization and the frame synchronization largely affect the bit error rate, in order to indicate the reliability of the measurement data, the synchronization characteristics are also displayed simultaneously as shown in FIG. 9. Furthermore, by simultaneously displaying the packet error rate, the reliability of the bit error rate is further supported.

Furthermore, according to the embodiment, even if the content of the reception data is unknown, the error rate can be measured.

Furthermore, since it is possible to modify the displaying method and the saving method of the measurement data, the error rate measuring apparatus capable of being used easily is obtainable. For example, since the bit error rate of the BIC portion, the bit error rate of the packet portion and the packet error rate can be simultaneously displayed on the monitor 28 in a real time fashion, it is unnecessary to save the error rate. In addition, it is possible to read the values of the error rates from the monitor 28 or it is possible to make the monitor 28 to be watched easily by deleting the error rate being unnecessary to be displayed.

Figure 17:
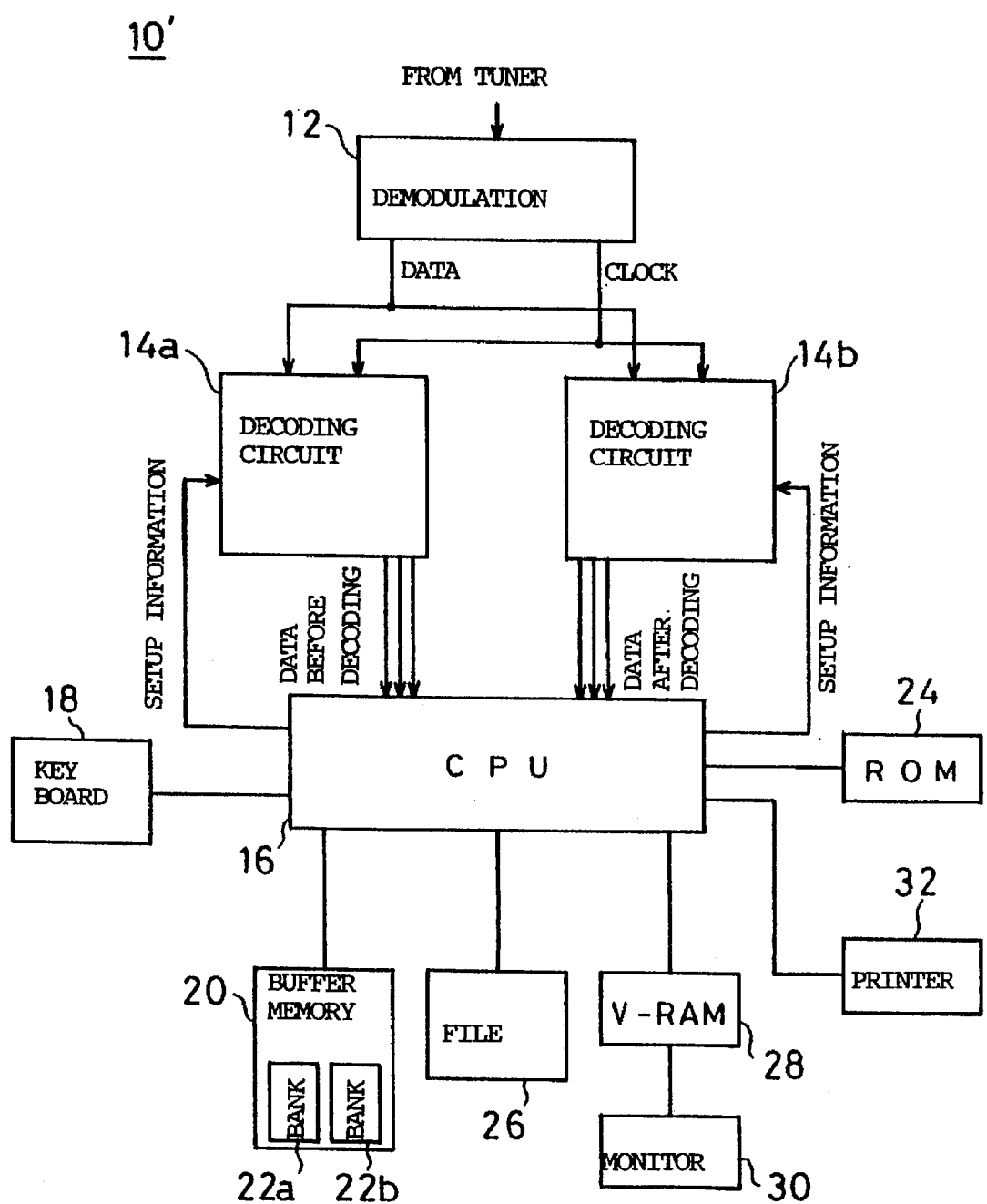
FIG. 17 is a block diagram showing another embodiment according to the present invention.

An error rate measuring apparatus 10' of another embodiment according to the present invention is shown in FIG. 17, and the apparatus 10' includes two decoding circuits 14a and 14b, and one decoding circuit 14a outputs the data before decoding as it is, and another decoding circuit 14b outputs the data after decoding. Since other portions of the error rate measuring apparatus 10' are similar to other portions of the error rate measuring apparatus 10 shown in FIG. 1, by using the same reference numerals, a duplicate description will be omitted here.

As similar to the decoding circuit 14, a synchronization reproduction/error correction IC such as "LC72700E" is included in the decoding circuit 14b which outputs the data after decoding, but does not output the data before decoding.

Figure 18:
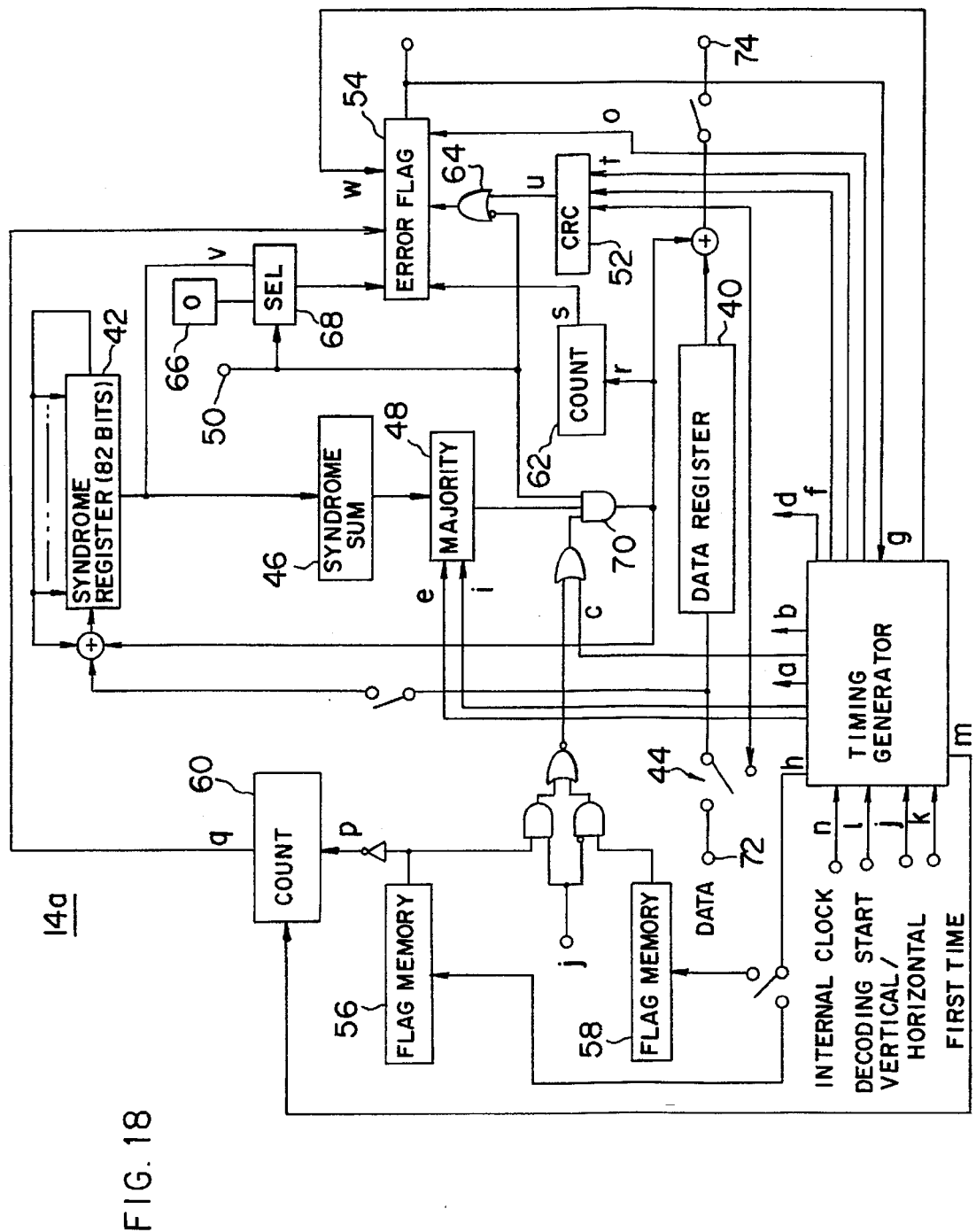
FIG. 18 is a block diagram showing one example of a decoding circuit utilized in FIG. 17 embodiment.

The decoding circuit 14a is constructed as shown in FIG. 18, for example. In the decoding circuit 14a shown in FIG. 18, data are respectively loaded to a data register 40 and a syndrome register 42, and if the data of 272 bits is loaded to the data register 40, a switch 44 at a preceding stage of the data register 40 is switched such that the data in the data register 40 is rotated. The suitable number of the bits out of 82 bits being a parity signal are inputted from the syndrome register 42 to a syndrome sum calculation circuit 46 in which syndrome calculation equations of seventeen (17) are calculated, and then, seventeen (17) syndrome values are applied to a majority circuit 48. In the majority circuit 48, a threshold value is set in advance, and the error correction of the data and the modification of the syndrome register 42 are performed according to a result of a modulo calculation of a starting bit of the data register 40. Such an operation is performed for each of the 272 bits. Then, the operation for each bit is completed, a similar processing is repeated with setting a smaller threshold value in the majority circuit 48.

In a case where a high level signal designating the error correction is outputted from a terminal 50 as setup information, only a time that all outputs from the syndrome register 42 after correction are "0" and the data is determined as correct by a CRC check circuit 52, it is determined that the decoding is successful, and then, an error flag indicating that the decoding is successful is outputted from an error flag circuit 54. Furthermore, in a flag memory 56, a decoding result of a fist time horizontal direction is stored as a flag, and in a flag memory 58, a decoding result of the vertical direction is stored as a flag.

In performing the decoding in the vertical direction after the decoding of the first time horizontal direction, if the decoding result of the horizontal direction being corresponding to a bit to be judged and stored in the flag memory 56 indicates that the decoding in the horizontal direction is successful, no correction is applied to the bit to be judged. At this time, an output of the majority circuit 48 is forcedly made be invalid.

Furthermore, in performing the decoding in the vertical direction if a count value of the packets in each of which the decoding of the first time horizontal direction is unsuccessful, which count value being counted by a decoding failure packet number count circuit 60, is larger than a predetermined value, the number of the corrected bits at the decoding in the vertical direction is counted by an error corrected bit number count circuit 62. If a count value of the count circuit 62 is larger than a predetermined value, it is regarded as that the decoding in the vertical direction is unsuccessful.

Furthermore, in performing the decoding of the second time horizontal direction after the decoding in the vertical direction, if the threshold value in the majority circuit 48 is larger than a predetermined value, it is determined whether or not the error correction is to be performed with referring to the decoding result in the vertical direction being stored in the flag memory 58, and if the threshold value in the majority circuit 48 is less than the predetermined value, it is determined whether or not the error correction is to be performed without referring to the decoding result in the vertical direction. In addition, the error flag circuit 54 changes a condition by which the decoding becomes successful or unsuccessful in accordance with an output from the error corrected bit number count circuit 62.

In the decoding circuit 14a, an OR circuit 64 is inserted between the CRC check circuit 52 and the error flag circuit 54, and a "0" output circuit 66 and a selector 68 are inserted between the syndrome register 42 and the error flag circuit 54. More specifically, an inverted signal of the output from the terminal 50 and an output from the CRC check circuit 52 are applied to the OR circuit 64, and an ORed output is applied to the error flag circuit 54. Furthermore, the output from the syndrome register 42 and an output from the "0" output circuit 66 are applied to the selector 68, and one of the outputs selected according to the output from the terminal 50 is applied to the error flag circuit 54 from the selector 68. The output from the terminal 50 is also applied to an AND gate 70.

By constructing the decoding circuit 14a in the above described manner, if the error correction is to be performed, a high level signal is applied from the terminal 50, and therefore, a normal decoding operation is implemented.

On the other hand, if the data inputted from a terminal 72 is to be withdrawn from a terminal 74 without decoding, a low level signal is applied from the terminal 50. In response to the low level signal, an output of the AND gate 70 always becomes a low level, and therefore, the error correction of the data and the modification of the syndrome register 42 are not performed, and the data is only rotated.

Furthermore, to the error flag circuit 54, a high level signal is always applied from the OR circuit 64 and "0" is always applied from the selector 68. Therefore, the error flag circuit 54 receiving these signals determines that all the outputs of the syndrome register 42 are "0" and the signal indicating that the data is correct is applied from the CRC check circuit 52, the error flag indicating that the decoding is successful is outputted from the error flag circuit 54.

Therefore, by applying a low level signal from the terminal 50 as the setup information, the data applied from the demodulator 12 via the terminal 72 can be applied to the CPU 16 via the terminal 74 without decoding. In addition, since the error flag circuit 54 determines that the decoding is successful, it is possible to send the data applied from the demodulator 12 to the CPU 16 in a manner that the data that the decoding is successful is streamed. Therefore, in this embodiment shown, by applying the low level signal to the decoding circuit 14a from the terminal 50, the decoding circuit 14a is operated.

In the error rate measuring apparatus 10' utilizing the decoding circuit 14a outputting the data before decoding and the decoding circuit 14b outputting the data after decoding, circuit scales of the decoding circuits 14a and 14b can be made small, and accordingly, it is possible to construct the error rate measuring apparatus 10' with utilizing LSIs for consumer purpose.

Figure 19:
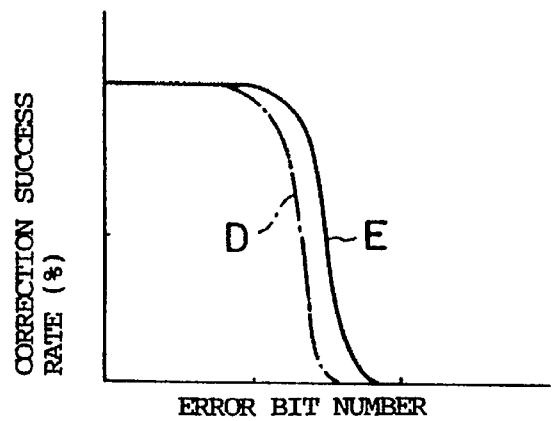
FIG. 19 is a graph showing that the relationship between the error bit number and the correction success rate is affected by a decoding success packet number in a vertical direction.
Figure 20:
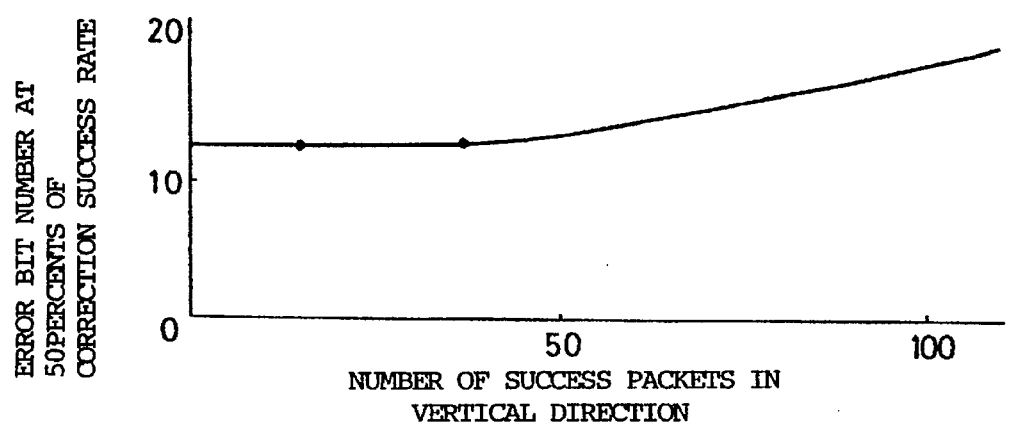
FIG. 20 is a graph showing a relationship between the decoding success packet number in the vertical direction and the error bit number at 50 percents of the correction success rate.

Furthermore, the relationship between the error bit number and the rate that the correction is successful is affected by the number of the packets that the decoding in the vertical direction is successful as shown in FIG. 19. A characteristic curve shown by a one-dotted line D indicates a case where the number of the packets in each of which the decoding in the vertical direction is successful is small, and a characteristic curve shown by a solid line E indicates a case where the number of the packets in each of which the decoding in the vertical direction is successful is large. Therefore, if the presumed error bit number is adjusted in view of the number of the packets that the decoding in the vertical direction is successful, it is possible to make the accuracy of the presumption higher. For example, the presumed error bit number may be adjusted according to a relationship between the number of the packets that the decoding in the vertical direction is successful and the error bit number at 50 percents of the correction success rate as shown in FIG. 20. Furthermore, the influence of the number of the packets that the decoding in the vertical direction is successful to the error correction rate becomes remarkable at a time that the decoding in the first time horizontal direction is successful for more than few or several ten packets.

Figure 21:
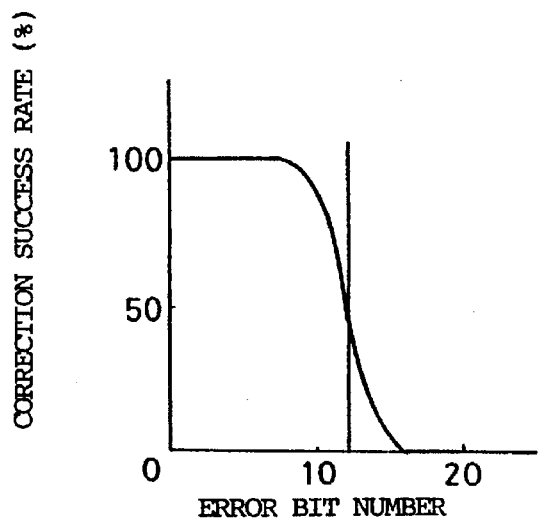
FIG. 21 is a graph showing a relationship between the error bit number and the correction success rate in a (272, 190) shortened difference cyclic code.

Furthermore, the embodiments were described on the assumption that the (272, 190) shortened difference cyclic code is made as "product code"; however, in a case where the code is not the product code, e.g. the code used in a text broadcasting system, the relationship between the error bit number and the correction success rate becomes as shown in FIG. 21. In such a case, the error bit number at 50 percents of the correction success rate is at a degree of "12", and therefore, the presumed error bit number may be set more than "12", i.e. as "12" or "13".

Furthermore, in the above described embodiment, the (272, 190) shortened difference cyclic code is utilized, it is possible to apply the present invention to a (7,3) code, (21, 11) code, (73, 45) code, (273, 191) code and (1057, 813) code and shortened code of these codes.

Furthermore, the present invention can be implemented with utilizing a personal computer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An error rate measuring apparatus for detecting a reception state of digital data including a synchronization signal, comprising:

a decoding means for receiving said digital data, for outputting said digital data before decoding and for outputting said digital data after decoding, wherein said digital data includes code data having a code capable of being decoded by a majority logic method; and an error rate measurement means for measuring an error rate on the basis of said digital data before decoding and said digital data after decoding which are both output from said decoding means, wherein said error rate measurement means includes an error bit number calculation means for calculating an error bit number by comparing said data before decoding and said data after decoding of a packet which is decoded successfully, a presumed error bit number setting means for setting a predetermined presumed error bit number as an error bit number of a packet which is decoded unsuccessfully, and a first bit error rate measurement means for evaluating a bit error rate of a packet portion on the basis of said error bit number calculated by said error bit number calculation means and said presumed error bit number set by said presumed error bit number setting means, wherein said presumed error bit number setting means includes a means for setting an arbitrary value at below 50 percent of a correction success rate.

2. An apparatus according to claim 1, said decoding means includes a first decoder for outputting said digital data before decoding, and a second decoder for outputting said digital data after decoding.

3. An apparatus according to claim 1, wherein said code data includes FM data in an FM multiplex broadcasting system, said FM data including a frame having said synchronization signal and packets for each block.

4. An apparatus according to claim 1, further comprising a success packet calculation means for calculating the number of success packets in each of which decoding in a first time horizontal direction is successful, wherein said means sets said presumed error bit number in accordance with said number of the success packets.

5. An apparatus according to any one of claims 1 or 4, wherein said error rate measurement means includes a means for setting a predetermined error bit number as said error bit number of a packet included in a block that no frame synchronization is settled.

6. An apparatus according to any one of claims 1 or 4, further comprising a second bit error rate measurement means for measuring a bit error rate in a synchronization signal portion on the basis of said synchronization signal.

7. An apparatus according to claim 6, wherein said second bit error rate measurement means includes a means for setting a predetermined error bit number as said error bit number in said synchronization portion for a block that no synchronization is settled.

8. An apparatus according to claim 7, further comprising a packet error rate measurement means for measuring a packet error rate.

9. An apparatus according to claim 8, further comprising a block measurement means for measuring a ratio of blocks that the frame synchronization is settled, and a ratio of blocks that a block synchronization is settled.

10. An apparatus according to claim 1 or 4, further comprising a measurement range setting means for setting a measurement range so as to include a plurality of blocks.

11. An apparatus according to claim 1 or 4, further comprising a display means for displaying measured data.

12. An apparatus according to claim 11, wherein said display means includes a first mode setting means for setting a first mode wherein respective measured data are simultaneously displayed.

13. An apparatus according to claim 11, wherein said display means includes a second mode setting means for setting a second mode wherein respective measured data are individually displayed.

14. An apparatus according to claim 1 or 4, further comprising an output means for printing-out measured data.

15. An apparatus according to claim 14, wherein said output means includes a storage means for storing said measured data, and a reading means for reading-out said measured data from said storage means.

16. An error rate measuring apparatus for detecting a reception state of digital data including a synchronization signal, comprising:

a decoding means for receiving said digital data, for outputting said digital data before decoding and for outputting said digital data after decoding, wherein said digital data includes code data having a code capable of being decoded by a majority logic method; and an error rate measurement means for measuring an error rate on the basis of said digital data before decoding and said digital data after decoding which are both output from said decoding means, wherein said error rate measurement means includes an error bit number calculation means for calculating an error bit number by comparing said data before decoding and said data after decoding of a packet which is decoded successfully, a presumed error bit number setting means for setting a predetermined presumed error bit number as an error bit number of a packet which is decoded unsuccessfully, and a first bit error rate measurement means for evaluating a bit error rate of a packet portion on the basis of said error bit number calculated by said error bit number calculation means and said presumed error bit number set by said presumed error bit number setting means.

* * * * *